United States Patent
Cheng et al.

(10) Patent No.: US 11,575,778 B2
(45) Date of Patent: Feb. 7, 2023

(54) HINGE AND MOBILE TERMINAL

(71) Applicant: VIVO MOBILE COMMUNICATION CO., LTD., Chang'an Dongguan (CN)

(72) Inventors: Dongcun Cheng, Chang'an Dongguan (CN); Zhengjun Luo, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/103,074

(22) Filed: Nov. 24, 2020

(65) Prior Publication Data
US 2021/0084133 A1 Mar. 18, 2021

Related U.S. Application Data

(63) Continuation of application No. PCT/CN2019/086362, filed on May 10, 2019.

(30) Foreign Application Priority Data
May 24, 2018 (CN) .......................... 201810510395.8

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .. H04M 1/0216; H04M 1/0268; H04M 1/026; H04M 1/0214; H04M 1/022;
(Continued)

(56) References Cited

U.S. PATENT DOCUMENTS 10,070,546 B1 * 9/2018 Hsu ..................... H04M 1/0268
2009/0061964 A1 3/2009 Kim et al.
(Continued)

FOREIGN PATENT DOCUMENTS

CN 2828860 A1 5/2014
CN 107077172 A 8/2017
(Continued)

OTHER PUBLICATIONS

International Search Report & Written Opinion related to Application No. PCT/CN2019/086362; dated Dec. 3, 2020.
(Continued)

*Primary Examiner* — Lester G Kincaid
*Assistant Examiner* — Maryam Soltanzadeh
(74) *Attorney, Agent, or Firm* — von Briesen & Roper, s.c.

(57) ABSTRACT

The present disclosure provides a hinge and a mobile terminal. The hinge includes at least two joints that are sequentially connected. Each joint includes a joint body, a rotation structure provided at a first end portion of the joint body, and a position-limit structure provided at a second end portion of the joint body. The rotation structures of any adjacent two joints are socketed with each other. The rotation structures of adjacent two joints are capable of rotating relative to each other. The adjacent two joints are opened or closed via relative reciprocating motion between the position-limit structures of the adjacent two joints. When an opening degree of the adjacent two joints reaches a preset value, the position-limit structures of the two adjacent joints stop each other.

20 Claims, 8 Drawing Sheets

(58) Field of Classification Search
CPC .... G06F 1/1652; G06F 1/1681; G06F 1/1616; F16C 11/04; H05K 5/0226; H05K 5/0017; E05D 3/06; E05D 7/00; E05D 11/1028; G09F 9/301; E05Y 2900/606
See application file for complete search history.

(56) References Cited

U.S. PATENT DOCUMENTS

| | | | |
|---|---|---|---|
| 2016/0132075 | A1 | 5/2016 | Tazbaz |
| 2016/0139634 | A1* | 5/2016 | Cho ................... G06F 1/1652 16/366 |
| 2016/0349802 | A1 | 12/2016 | Ahn et al. |
| 2016/0370829 | A1 | 12/2016 | Shu et al. |
| 2017/0023987 | A1 | 1/2017 | Wang |
| 2018/0024590 | A1* | 1/2018 | Nakamura ............. G06F 3/041 349/58 |
| 2018/0067519 | A1* | 3/2018 | Tazbaz .................. E05D 11/10 |
| 2018/0092223 | A1* | 3/2018 | Hsu .................... H04M 1/0268 |
| 2018/0275725 | A1 | 9/2018 | Lin et al. |
| 2018/0329460 | A1 | 11/2018 | Song |
| 2021/0075895 | A1 | 3/2021 | Cheng |
| 2021/0084133 | A1 | 3/2021 | Cheng et al. |

FOREIGN PATENT DOCUMENTS

| | | |
|---|---|---|
| CN | 206559426 U | 10/2017 |
| CN | 107621853 A | 1/2018 |
| CN | 206958530 U | 2/2018 |
| CN | 207268258 U | 4/2018 |
| CN | 108712529 A | 10/2018 |
| CN | 108712530 A | 10/2018 |
| KR | 20090021481 A | 3/2009 |
| KR | 20170085537 A | 7/2017 |
| TW | M559431 U | 5/2018 |

OTHER PUBLICATIONS

Extended European Search Report for related Application No. 19806475.0; dated Jun. 4, 2021.
Japanese Office Action for related Application No. 2020-565884; dated Sep. 30, 2021.
Korean Office Action for related Application No. 10-2020-7037015; dated Nov. 1, 2021.

* cited by examiner

HINGE AND MOBILE TERMINAL

CROSS-REFERENCE TO RELATED APPLICATION

This application is a continuation application of International Application No. PCT/CN2019/086362 filed on May 10, 2019, which claims the priority of Chinese Application No. 201810510395.8, filed on May 24, 2018, which is incorporated herein by reference in its entirety.

TECHNICAL FIELD

The present disclosure relates to the field of communications technology, and in particular to a hinge and a mobile terminal.

BACKGROUND

With the development of communications technology, functions of mobile terminals are becoming more and more powerful, and the application of flexible screens is becoming increasingly popular. A hinge that supports bending of the flexible screen and the like is generally composed of various parts. One end surface of the hinge is attached to a non-display surface corresponding to a bendable portion of the flexible screen, and the other end surface of the hinge supports bending of the bendable portion of the flexible screen. The hinge that supports bending in the related art has a complicated structure and various types of parts, which are difficult to process and assemble.

It can be seen that the hinge in the related art has a technical problem that various types of parts make it difficult to process and assemble.

SUMMARY

Embodiments of the present disclosure provide a hinge and a mobile terminal, to solve the technical problem that the hinge in the related art has various types of parts, resulting in difficulty in processing and assembling.

According to a first aspect, one embodiment of the present disclosure provides a hinge, including: at least two joints that are sequentially connected;

wherein each joint includes a joint body, a rotation structure provided at a first end portion of the joint body, and a position-limit structure provided at a second end portion of the joint body;

the rotation structures of any adjacent two joints are socketed with each other;

the rotation structures of adjacent two joints are capable of rotating relative to each other; the adjacent two joints are opened or closed via relative reciprocating motion between the position-limit structures of the adjacent two joints; when an opening degree of the adjacent two joints reaches a preset value, the position-limit structures of the two adjacent joints stop each other.

According to a second aspect, one embodiment of the present disclosure provides a mobile terminal, including: a flexible screen and the hinge according to the first aspect.

The rotation structures of at least two joints of the hinge are connected in sequence to form a fitting surface; the fitting surface is attached to a non-display surface at a position corresponding to a bendable portion of the flexible screen.

The position-limit structures of at least two joints of the hinge are connected in sequence to form a supporting surface; the supporting surface supports the non-display surface of the flexible screen.

In the embodiment of the present disclosure, the hinge includes at least two joints of the same structure that are connected in sequence, the rotation structures of any two adjacent joints are socketed with each other so that the rotation structures of the adjacent two joints are relatively rotated, and the opening degree of the adjacent two joints is limited within a preset range by the position-limit structure. In this way, the joints forming the hinge have the same structure, which is convenient for processing and assembling. A length and a bending degree of the hinge may be changed by increasing or decreasing the number of joints, which optimizes the assembly scheme of the hinge.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate some of the embodiments set forth in the present disclosure. A person of ordinary skill in the art can obtain other drawings based on the described drawings without paying creative labor.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present application. All other embodiments obtained by a person of ordinary skill in the art based on the embodiments of the present disclosure fall within the scope of the present disclosure.

Figure 1:
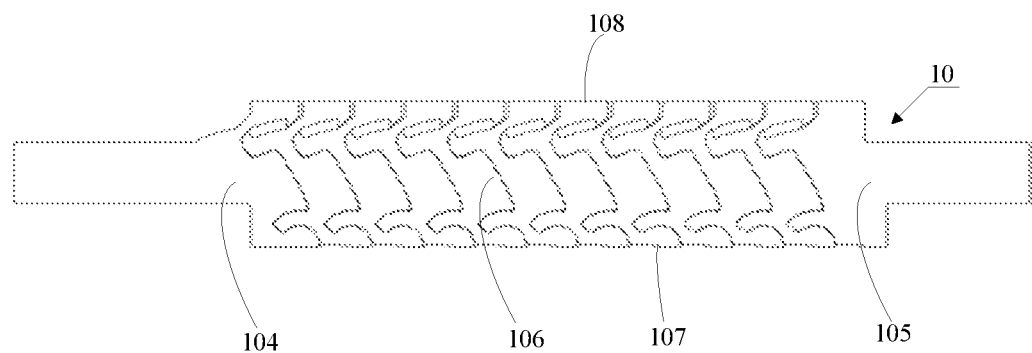
FIG. 1 is a schematic structural diagram of a hinge according to an embodiment of the present disclosure.
Figure 2:
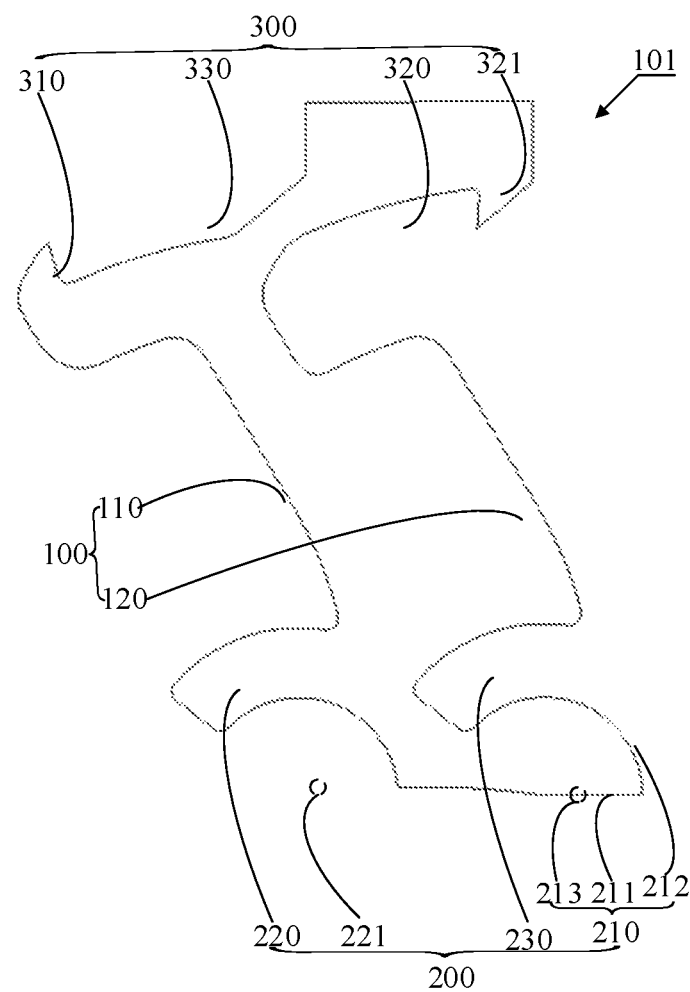
FIG. 2 is a schematic structural diagram of a joint of another hinge according to an embodiment of the present disclosure.
Figure 3:
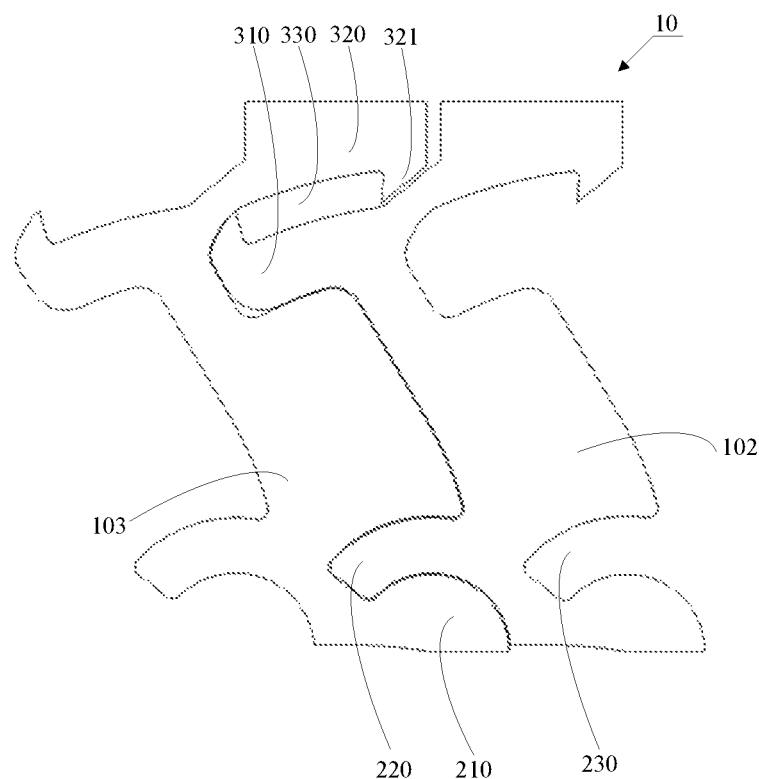
FIG. 3 is a schematic structural diagram of another hinge according to an embodiment of the present disclosure.
Figure 4:
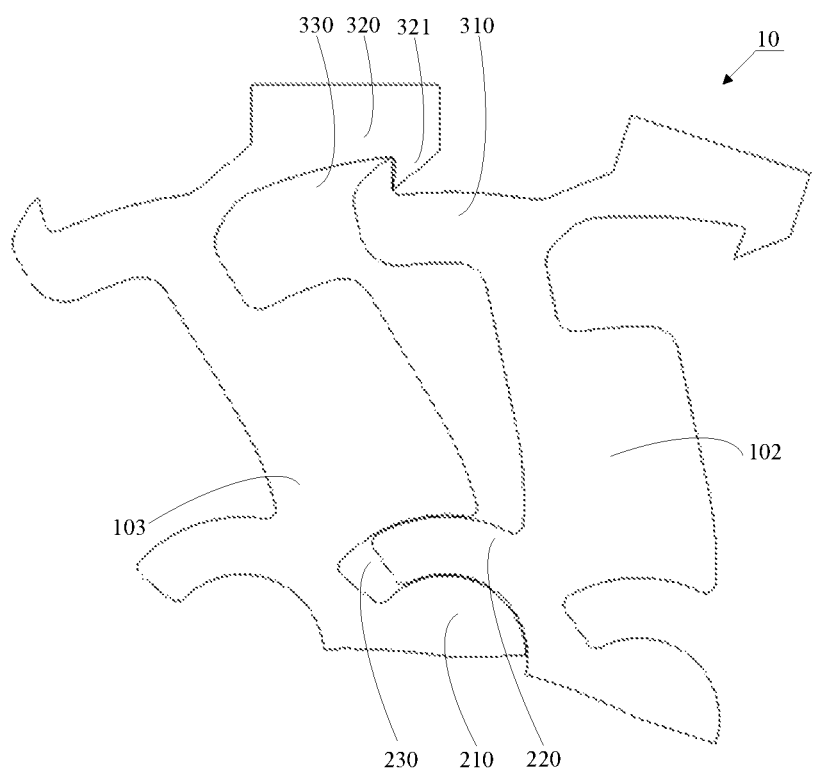
FIG. 4 is a schematic structural diagram of another hinge according to an embodiment of the present disclosure.

Referring to FIG. 1, it is a schematic structural diagram of a hinge according to an embodiment of the present disclosure. As shown in FIG. 1 and FIG. 2, a hinge 10 includes at least two joints 101, and the at least two joints 101 are sequentially connected.

Each joint 101 includes a joint body 100, a rotation structure 200 provided at a first end portion of the joint body 100, and a position-limit structure 300 provided at a second end portion of the joint body 100.

The rotation structures 200 of any two adjacent joints 101 are socketed with each other.

The rotation structures 200 of adjacent two joints 101 are capable of rotating relative to each other. The position-limit structures 300 of adjacent two joints 101 can move reciprocally relative to each other to open or close the adjacent two joints 101. When an opening degree of the adjacent two joints 101 reaches a preset value, the position-limit structures 300 of two adjacent joints 101 stop each other.

The hinge 10 according to this embodiment includes at least two joints 101 that are connected in sequence, and structures of the at least two joints 101 may be the same. The joint body 100 of each joint 101 is a main component of the joint 101. The joint body 100 includes the first end portion and the second end portion which are opposite to each other. One end of the joint body 100, which is attached to an attached component, is taken as the first end portion, and another end far from the first end portion is taken as the second end portion.

The rotation structure 200 provided at the first end portion of the joint body 100 is used to realize relative rotation between the joints 101. The position-limit structure 300 provided at the second end portion of the joint body 100 is used to limit the relative rotation between the joints 101. Among at least two joints 101, the rotation structures 200 of any two adjacent joints 101 are socketed with each other, and the position-limit structures 300 of two adjacent joints 101 are engaged with each other, thereby realizing the opening or closing between adjacent joints 101. The opening or closing between at least two joints 101 of the hinge 10 can realize the supporting effect of the hinge 10 on the attached component.

In some embodiments, as shown in FIG. 1, the hinge 10 may also be composed of at least three joints 101 which are sequentially connected. The joints 101 at two ends of the hinge 10 may be defined as a head joint 104 and a tail joint 105, respectively. One joint 101 between the head joint 104 and the tail joint 105 may be defined as a middle joint 106. The hinge 10 may include the head joint 104, the tail joint 105, and at least one middle joint 106. Structures of the at least one middle joint 106 may be completely the same. In addition to the rotation structure 200 and the position-limit structure 300 that match the adjacent joint 101, the head joint 104 and the tail joint 105 each may further include a connecting portion for connecting to the attached component.

The rotation structures 200 of any two adjacent joints 101 are socketed with each other, so that the rotation structures 200 of two adjacent joints 101 are relatively rotated. In this way, when the adjacent joints 101 are relatively rotated with the rotation structures 200, the position-limit structures 300 provided at the second end portions of the adjacent two joints 101 can also reciprocate relative to each other, thereby achieving the opening or closing of the adjacent two joints 101. By the presence of a position-limit structure 300 at the second end portion of the joint 101, the position-limit structures 300 of two adjacent joints 101 can stop each other, so that the opening degree of the adjacent two joints 101 can be limited by the position-limit structures 300. When the opening degree of adjacent two joints 101 reaches a preset value, the position-limit structures 300 of the adjacent two joints 101 stop each other to limit excessive opening of the hinge 10.

In the hinge provided in this embodiment, the rotation structures of any two adjacent joints are socketed with each other so that the rotation structures of the adjacent two joints are relatively rotated, and the opening degree of the adjacent two joints is limited within a preset range by the position-limit structure. In this way, the joints forming the hinge have the same structure, which is convenient for processing and assembling. A length and a bending degree of the hinge may be changed by increasing or decreasing the number of joints, which optimizes the assembly scheme of the hinge.

Based on the above embodiment, as shown in FIG. 1 to FIG. 4, the rotation structure 200 may include a rotation shaft 210 and an arc rotation bearing shell 220. An arc gap 230 is defined between the rotation shaft 210 and the joint body 100.

In any two adjacent joints 101, the rotation bearing shell 220 of a first joint 102 is inserted into the arc gap 230 of a second joint 103, to be socketed with the rotation shaft 210 of the second joint 103. The rotation shaft 210 of the second joint 103 can rotate relative to the rotation bearing shell 220 of the first joint 102.

When assembling the hinge 10 provided in this embodiment, adjacent two joints can be assembled together. Specifically, any two adjacent joints may be defined as a first joint 102 and a second joint 103, respectively. Here, the description is only for any two adjacent joints, and is not specifically limited to a certain joint in the hinge 10. For example, when one joint is assembled with a front joint, the one joint may be defined as the second joint 103; and when the one joint is assembled with a rear joint, the one joint then may be defined as the first joint 102.

In the hinge 10 provided in this embodiment, the rotation structure 200 of each joint 101 includes a rotation shaft 210 and an arc rotation bearing shell 220. An arc gap 230 is defined between the rotation shaft 210 and the joint body 100 of each joint 101, and is used to accommodate the rotation bearing shell 220.

When the two adjacent joints 101 are assembled, the rotation bearing shell 220 of the first joint 102 is inserted into the arc gap 230 of the second joint 103, so that the rotation bearing shell 220 of the first joint 102 and the rotation shaft 210 of the second joint 103 are socketed with each other, with the rotation shaft 210 of the second joint 103 capable of rotating relative to the rotation bearing shell 220 of the first joint 102. In this way, the rotation shaft 210 of each joint 101 can be relatively rotated around the rotation bearing shell 220 of an adjacent joint 101; and the rotation bearing shell 220 of each joint 101 can be relatively rotated around the rotation shaft 210 of an adjacent joint 101. That is, the relative rotation of any two adjacent joints 101 in the hinge 10 is achieved.

Based on the above embodiment, as shown in FIG. 1, FIG. 3 to FIG. 9, when any two adjacent joints 101 are in a closed state, lower surfaces of the rotation shafts 210 of each of the joints 101 define a horizontal fitting surface.

In addition, when the at least two joints 101 are in an open state, the lower surfaces of the rotation shafts 210 of each of the joints 101 define an arc fitting surface.

In the hinge 10 provided in this embodiment, when any two adjacent joints 101 are rotated, the lower surfaces of the rotation shafts 210 of the joints 101 may be connected to form a horizontal surface or an arc surface as a fitting surface 107. By the fitting surface 107 which is formed by connected lower surfaces of the rotation shafts 210 of the joints 101, the hinge 10 composed of at least two connected joints 101 may be straightened or bent.

In this embodiment, considering the manufacturing error of mechanical structures and the incomplete fit of rotation, the defined horizontal surface is horizontal rather than a standard horizontal surface, and the defined arc surface is also curved but not limited to an arc surface. When two adjacent joints 101 rotate relative to each other, each of the at least two joints 101 may not be located on a standard plane or a standard arc surface, as long as the lower surface of the rotation shaft 210 is maintained on a horizontal surface or curved arc surface.

Specifically, according to different structures of the lower surfaces of the rotation shafts of each of the joints, the structure of the defined fitting surface is also varied.

First, if the lower surface of the rotation shaft of each joint is a horizontal plane, when at least two joints are closed, the lower surfaces of the rotation shafts of the at least two joints are connected to define a standard horizontal plane. When the at least two joints are opened, the lower surfaces of the rotation shafts of the at least two joints are connected to define an arc supporting surface. Since the lower surface of the rotation shaft of each joint is a horizontal plane and there may be an uneven connection between adjacent joints, the arc supporting surface formed by the connection of the lower surfaces of the rotation shafts of the at least two joints may be a non-standard arc surface.

Secondly, if the lower surface of the rotation shaft of each joint is an arc surface, when at least two joints are closed, a horizontal supporting surface formed by connection of the lower surfaces of the rotation shafts of the at least two joints may be a non-standard horizontal plane. When the at least two joints are opened, the lower surfaces of the rotation shafts of the at least two joints may be connected to form a standard arc supporting surface. Of course, a specific curvature and a bending type of the arc surface of the lower surface of the rotation shaft of the joint will also affect the curvature of the formed arc supporting surface, which is not limited here.

When the hinge 10 provided in this embodiment is used, the fitting surface 107 formed by connecting the lower surfaces of the rotation shafts 210 of at least two joints 101 is attached to the attached component, for example, being attached to a flexible screen. Upper surfaces of the position-limit structures 300 of the at least two joints 101 are connected to form a supporting surface 108. The supporting surface 108 extends along with the fitting surface 107 to support the opening or closing of the fitting surface 107. The lower surface of the rotating shaft 210 is attached to a bendable portion of the attached component. As a surface of the bendable portion of the attached component is bent or extended, via opening or closing of the joints 101 of the hinge 10, the fitting surface 107 of the hinge 10 follows the bending or extension of the surface of the bendable portion of the attached component. During an attaching process of the fitting surface 107 of the hinge 10, a total length of the fitting surface 107 of the hinge 10 remains unchanged, and the fitting surface 107 is not easy to fold or generate unevenness, and then the fitting surface 107 will not cause crush damage to the surface of the bendable portion of the attached component. The relative movement and stopping of the position-limit structures 300 at the second end portions of the joints 101 enable the supporting surface 108 of the hinge 10 to shrink or stretch within a certain range, thereby supporting shrinking or stretching of the fitting surface 107.

Based on the above embodiment, as shown in FIG. 1 to FIG. 9, the rotation shaft 210 may be a semi-circular rotation shaft 210, and a wrapping space of the rotation bearing shell 220 is matched with the rotation shaft 210.

In the hinge 10 provided in this embodiment, the rotation shaft 210 is a semi-circular rotation shaft 210. The semi-circular rotation shaft 210 includes a circular arc upper surface 212 and a horizontal lower surface 211. An axis 213 of the rotation shaft is located on the horizontal lower surface 211 of the rotation shaft 210. The arc gap 230 of the joint 101 is surrounded and defined by the circular arc upper surface 212 of the semi-circular rotation shaft 210 and the joint body 100, and is used to accommodate the rotation bearing shell 220 of the adjacent joint 101. The rotation bearing shell 220 of the joint 101 is also an approximately semi-circular structure. An engagement area of the rotation bearing shell 220 matches a shape of the circular arc upper surface of the semi-circular rotation shaft 210, and can just accommodate the semi-circular rotation shaft 210 of the adjacent joint 101. A virtual axis of the rotation bearing shell 220 is located on a lower surface of the semi-circular engagement area. The lower surface of the semi-circular engagement area and the lower surface of the semi-circular rotation shaft 210 are coplanar. In other words, the virtual axis of the rotation bearing shell 220 of the joint 101 is located on a plane where the lower surface of the rotation shaft of the joint is located. In this way, when any two adjacent joints 101 are assembled, the rotation bearing shell 220 of the first joint 102 is inserted into the arc gap 230 of the second joint 103, so that the rotation bearing shell 220 of the first joint 102 covers and fits the rotation shaft 210 of the second joint 103, thereby realizing relative rotation between the rotation bearing shell 220 of the first joint 102 and the rotation shaft 210 of the second joint 103. Since the virtual axis of the rotation bearing shell 220 of each joint 101 is on the lower surface of the rotation shaft 210 of each joint 101, when the two adjacent joints 101 are relatively rotated, the lower surfaces of the rotation axes 210 of the adjacent joints 101 are on the same horizontal plane or the same arc surface so that the fitting surface 107 of the hinge 10 can fit the surface of the bendable portion of the attached component.

Figure 9:
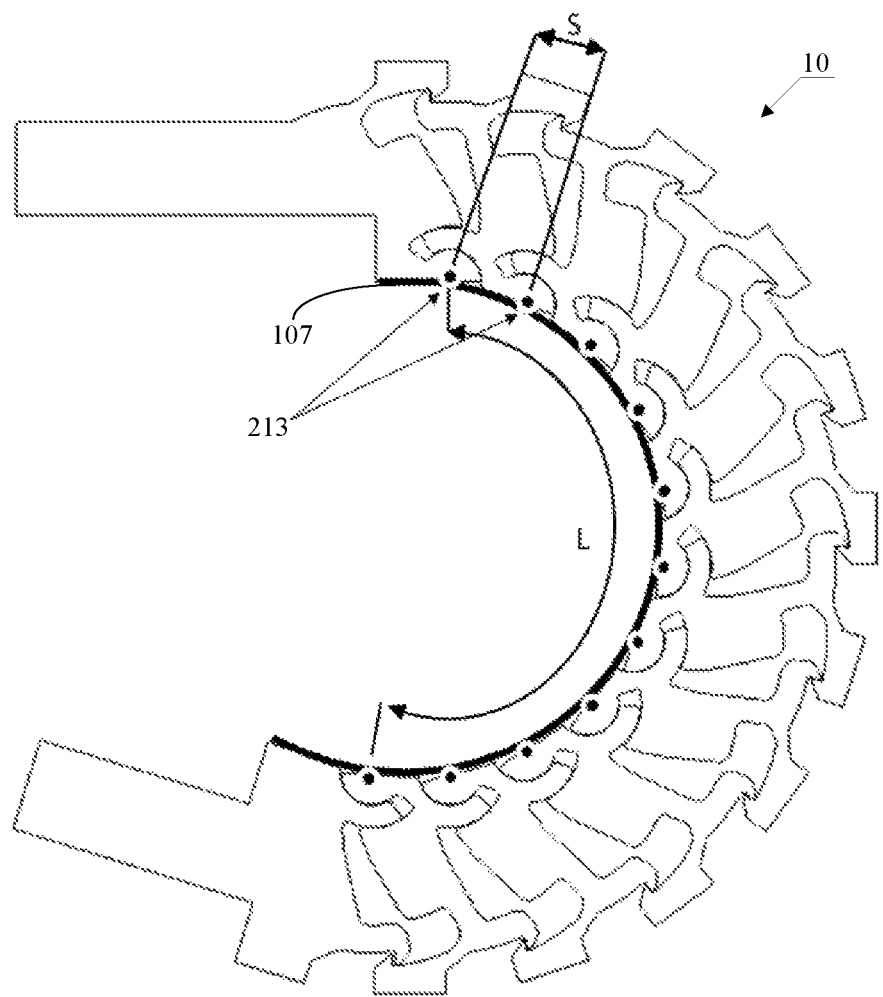
FIG. 9 is a schematic structural diagram of another hinge according to an embodiment of the present disclosure.
Figure 10:
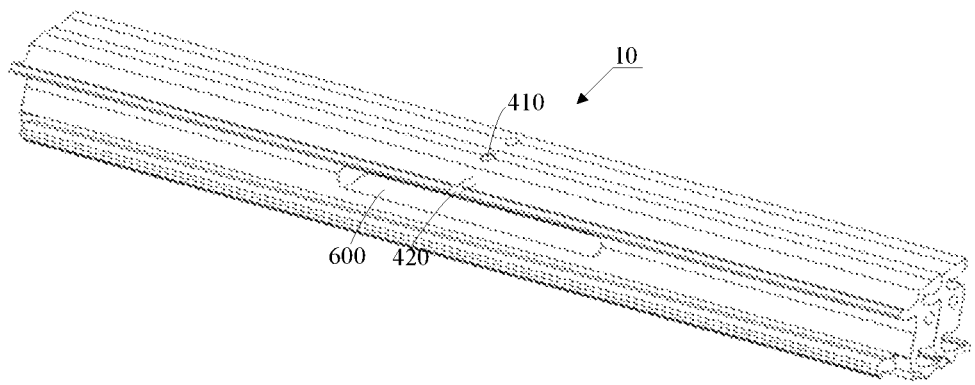
FIG. 10 is a schematic structural diagram of another hinge according to an embodiment of the present disclosure.

Based on the above embodiment, as shown in FIG. 9 and FIG. 10, the axes of the rotation shafts 210 of the at least two joints 101 are on the fitting surface 107 of the hinge 10. In this way, during rotation of the hinge 10, the total length of the fitting surface 107 of the hinge 10 may remain unchanged.

Figure 8:
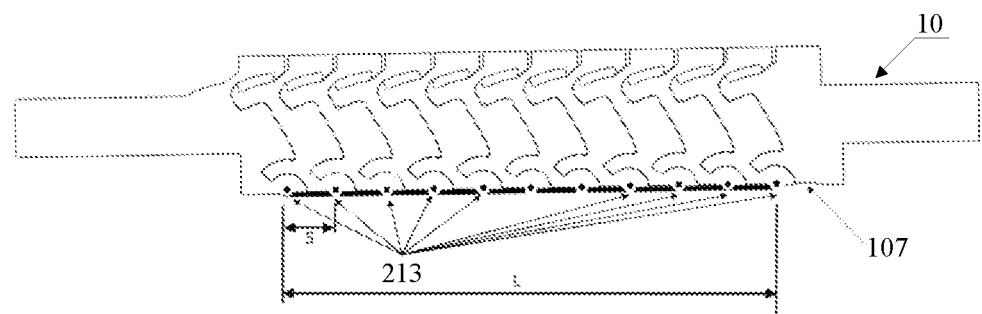
FIG. 8 is a schematic structural diagram of another hinge according to an embodiment of the present disclosure.

Specifically, it is assumed that a distance between virtual rotation centers is S, and the hinge 10 has n joints 101 in total. As shown in FIG. 8, when the hinge 10 is straightened, the total length of the fitting surface 107 of the hinge 10 is: $L=S*n$.

As shown in FIG. 9, when the hinge 10 is bent, since the distance S between the virtual rotation centers remains unchanged, and the total number of joints 101 remains unchanged, then, the total length of the fitting surface 107 of the hinge 10 is: $L=S*n$, that is, the total length of the fitting surface 107 when the hinge 10 is bent is consistent with the total length of the fitting surface 107 when the hinge 10 is straightened.

In this way, when the fitting surface 107 of the hinge 10 is attached to a flexible screen or other components, the total length of the fitting surface 107 remains unchanged, which can protect the attached component from being stretched or compressed, thereby improving fitting protection effect as well as supporting function of the hinge 10.

Based on the above embodiment, as shown in FIG. 1 to FIG. 9, the position-limit structure 300 may include a position-limit chute 320 and a position-limit hook 310. An opening-closing gap 330 is defined between the position-limit hook 310 and the position-limit chute 320.

In any two adjacent joints 101, the position-limit hook 310 of the first joint 102 extends into the position-limit chute 320 of the second joint 103, and a chute edge 321 of the position-limit chute 320 of the second joint 103 extends into the opening-closing gap. The position-limit hook 310 of the first joint 102 slides relative to the position-limit chute 320 of the second joint 103, thereby realizing the opening or closing of the adjacent two joints 101. When the opening degree of the adjacent two joints 101 reaches a preset value, the position-limit hook 310 of the first joint 102 and the chute edge 321 of the position-limit chute 320 of the second joint 103 stop each other.

In the joint 101 provided in this embodiment, the position-limit structure 300 on the second end portion of the hinge 10 may include the position-limit chute 320 and the position-limit hook 310, with the opening-closing gap defined between the position-limit hook 310 and the position-limit chute 320. In any adjacent joint 101, the position-limit hook 310 of the first joint 102 extends into the position-limit chute 320 of the second joint 103, so that the position-limit hook 310 of the first joint 102 is slidable within the position-limit chute 320 of the second joint 103, thereby realizing the opening or closing of two adjacent joints 101. Meanwhile, the chute edge 321 of the position-limit chute 320 of the second joint 103 extends into the opening-closing gap, so that the position-limit hook 310 of the first joint 102 and the chute edge 321 of the position-limit chute 320 of the second joint 103 can block each other, thereby limiting the opening degree of the two adjacent joints 101. In this way, when the opening degree of two adjacent joints reaches a preset value, the position-limit hook 310 of the first joint 102 and the chute edge 321 of the position-limit chute 320 of the second joint 103 can block each other to limit excessive opening of the hinge 10.

Figure 5:
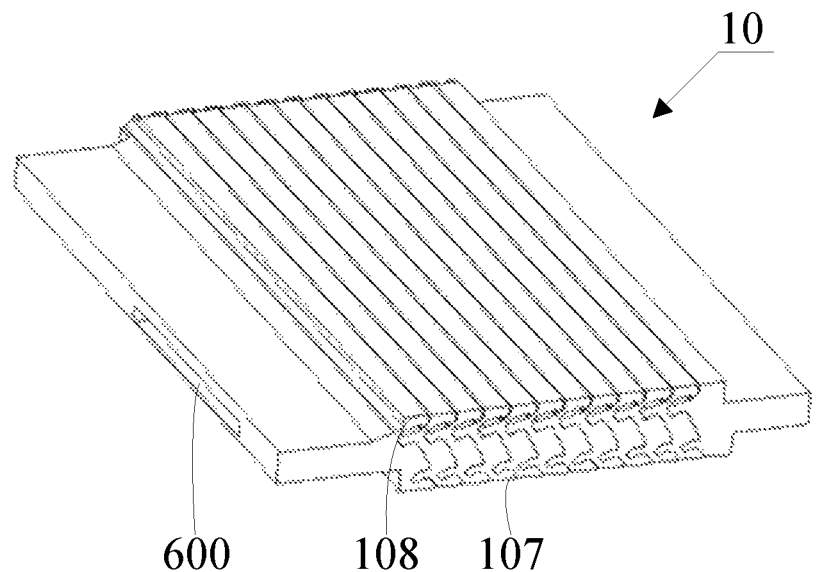
FIG. 5 is a schematic structural diagram of another hinge according to an embodiment of the present disclosure.
Figure 6:
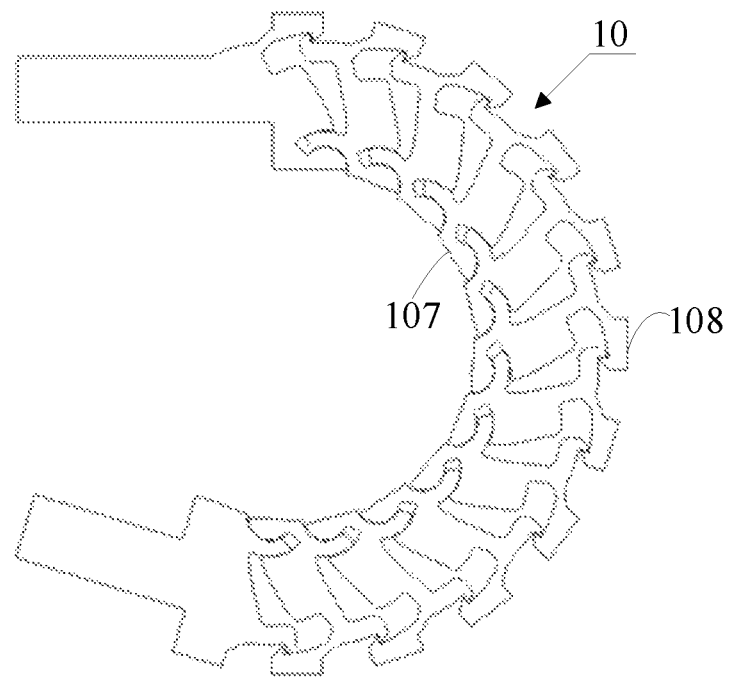
FIG. 6 is a schematic structural diagram of another hinge according to an embodiment of the present disclosure.
Figure 7:
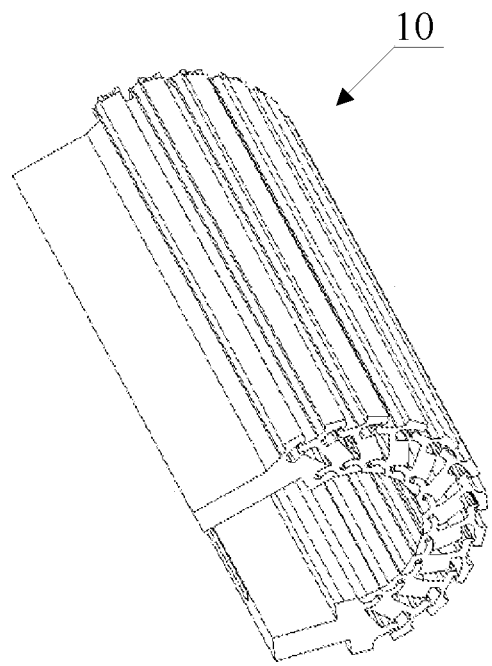
FIG. 7 is a schematic structural diagram of another hinge according to an embodiment of the present disclosure.

Based on the above embodiment, as shown in FIG. 1, FIG. 5 and FIG. 9, when any adjacent two joints are closed, outer surfaces of the position-limit chutes 320 of each of the joints form a horizontal supporting surface.

In addition, when at least two joints are opened, the outer surfaces of the position-limit chutes 320 of each of the joints form an arc supporting surface.

Considering that when the hinge 10 is attached, the lower surfaces of the rotation shafts 210 of each of the joints 101 are located on the same horizontal plane or the same arc surface, in order to ensure fitting integrity and supporting effect of the hinge 10, the supporting surface 108 formed by the connection of the position-limit structures 300 of each of the joints 101 is consistent with the fitting surface 107 formed by the connection of the rotation structures.

That is, when any adjacent two joints 101 are closed, the outer surfaces of the position-limit chutes 320 of each of the joints 101 form a horizontal supporting surface, or, when at least two joints 101 are opened, the outer surfaces of the position-limit chutes 320 of each of the joints 101 form an arc supporting surface.

Specifically, according to different outer surfaces of the position-limit chutes 320 of each of the joints 101, the formed supporting surface is varied.

First, if an outer surface of the position-limit chute of each joint is a horizontal plane, when at least two joints are closed, the outer surfaces of the position-limit chutes of the at least two joints are connected to form a standard horizontal plane. When the at least two joints are opened, the outer surfaces of the position-limit chutes of the at least two joints are connected to form an arc supporting surface. Since the outer surface of the position-limit chute of each joint is a horizontal plane and there may be uneven connection between adjacent joints, the arc supporting surface formed by the connection of the outer surfaces of the position-limit chutes of the at least two joints may be a non-standard arc surface.

Secondly, if an outer surface of the position-limit chute of each joint is an arc surface, when at least two joints are closed, a horizontal supporting surface formed by connecting the outer surfaces of the position-limit chutes of the at least two joints may be a non-standard horizontal plane. When the at least two joints are opened, the outer surfaces of the position-limit chutes of the at least two joints can be connected to form a standard arc supporting surface. Of course, a specific curvature and a bending type of the arc surface of the outer surface of the position-limit chute of the joint will also affect bending degree of the formed arc supporting surface, which is not limited here.

Based on the above embodiment, as shown in FIGS. 1 to 9, the outer surface of the position-limit chute 320 may be parallel to the lower surface of the rotation shaft 210.

In the hinge 10 provided in this embodiment, in order to achieve that an upper surface defined by the position-limit structures 300 of at least two joints 101 is consistent with the lower surface formed by connection of the rotation shafts 210 of the at least two joints 101, the outer surface of the position-limit chute 320 may be parallel with the lower surface of the rotation shaft 210. In this way, when any adjacent joints 101 in the hinge 10 are relatively rotated, as the position-limit structures 300 of the joints 101 rotate with the rotation structures 200 of the joints 101, the upper surface formed by connection of the position-limit structures 300 of the joints 101 may keep parallel with the lower surface formed by connection of the rotation structures 200 of the joints 101, that is, an upper surface formed by connection of the position-limit chutes 320 of at least two joints 101 is kept parallel with the lower surface formed by connection of the rotation shafts 210 of the at least two joints 101. When any two adjacent joints 101 are closed, the lower surfaces of the rotation shafts 210 of each of the joints 101 are located on a same horizontal plane, and the outer surfaces of the position-limit chutes 320 of the joints 101 are located on a same horizontal plane. When at least two joints 101 are opened, the lower surfaces of the rotation shafts 210 of each of the joints 101 are located on a same arc surface, and the outer surfaces of the position-limit chutes 320 of the joints 101 are located on a same arc surface. In this way, the supporting surface 108 of the joints 101 is stretched or bent with the fitting surface 107, which can effectively support the fitting surface 107 to fit and support the surface of the bendable portion of the attached component, without limiting a bending state of the surface of the bendable portion.

Based on the above embodiment, as shown in FIGS. 1 to 9, the joint body 100 of each joint 101 may include an accommodation groove 110 and a projection 120 disposed opposite to each other.

When any two adjacent joints 101 are in a closed state, the projection 120 of the first joint 102 fits into the accommodation groove 110 of the second joint 103.

In the hinge 10 provided in this embodiment, in order to further improve a fitting degree of the adjacent two joints 101 during the opening and closing process, the joint bodies 100 of the adjacent two joints 101 are set to as mutually matched structures. Specifically, the joint body 100 includes an accommodation groove 110 and a projection 120, the accommodation groove 110 and the projection 120 are disposed opposite to each other, and a surrounding space of the accommodation groove 110 matches the projection 120. When any two adjacent joints 101 are closed, the projection 120 of the first joint 102 may fit into the accommodation groove 110 of the second joint 103, so that the first joint 102 and the second joint 103 are completely fitted. In this way, the adjacent two joints 101 have a higher fitting degree when they are closed, which can reduce a volume of the hinge 10 after the hinge 10 is closed and reduce a movable gap between the joints 101, thereby improving dust-proof performance, regularity and supporting performance of the hinge 10 after the hinge 10 is closed. In addition, when the joint body 100 is provided with the projection 120 and the accommodation groove 110 that match each other, this can save the manufacturing cost of the joint 101.

Based on the above embodiment, as shown in FIG. 1, FIG. 5 to FIG. 9, and FIG. 12 to FIG. 13, for the head joint 104 and the tail joint 105 at two ends of at least two joints 101, the joint body 100 is strip-shaped. One end of the strip-shaped joint body 100 is socketed with the rotation structure 200 of an adjacent joint 101.

In the hinge 10 provided in this embodiment, the joints 101 at the two ends are defined as end joints, including the head joint 104 and the tail joint 105. The joint body 100 of the end joint is strip-shaped. The strip-shaped joint body 100 may include a joint connection end and a component connection end. The joint connection end is matched and connected with an adjacent middle joint 106. The component connection end is connected with the attached component or an accessory component of the attached component.

In a specific embodiment, the joint connection end may include the rotation structure 200 and the position-limit structure 300, for matching and connecting with an adjacent middle joint 106. The rotation shaft 210 and the arc gap 230 may only be set at a position where the joint connection end connects the rotation bearing shell 220 of the adjacent joint 101. The position-limit chute 320 may be set at a position where the joint connection end connects the position-limit hook 310 of the adjacent joint 101. The rotation bearing shell 220 of one middle joint 106 adjacent the joint connection end of the end joint is inserted into the arc gap 230 of the end joint, and the position-limit hook 310 of the adjacent middle joint 106 is inserted into the position-limit chute 320 of the end joint. The component connection end of the end joint is connected with the attached component or an accessory component of the attached component via a screw, an adhesive layer, or the like. In this way, the end joint can not only be matched and connected with the middle joint 106, but also fix the hinge 10 to the attached component. The joints 101 included in the hinge 10 have the same structure, which is convenient for production and processing.

Figure 11:
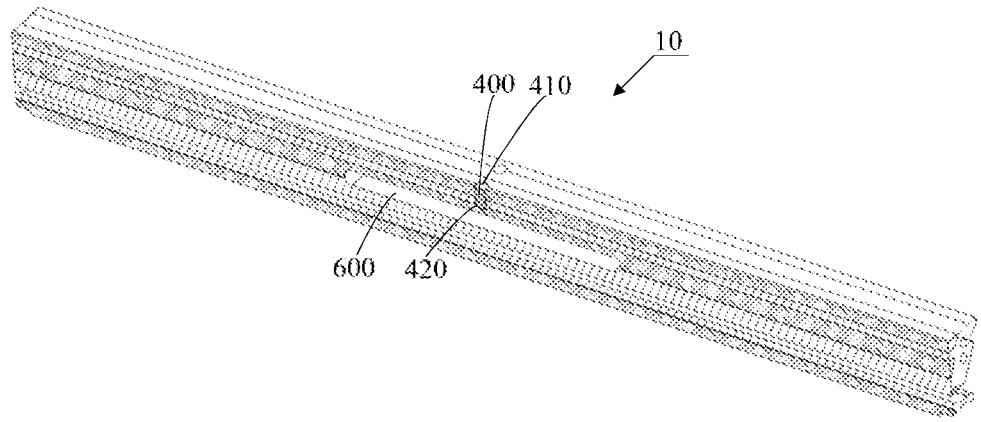
FIG. 11 is a schematic structural diagram of another hinge according to an embodiment of the present disclosure.
Figure 12:
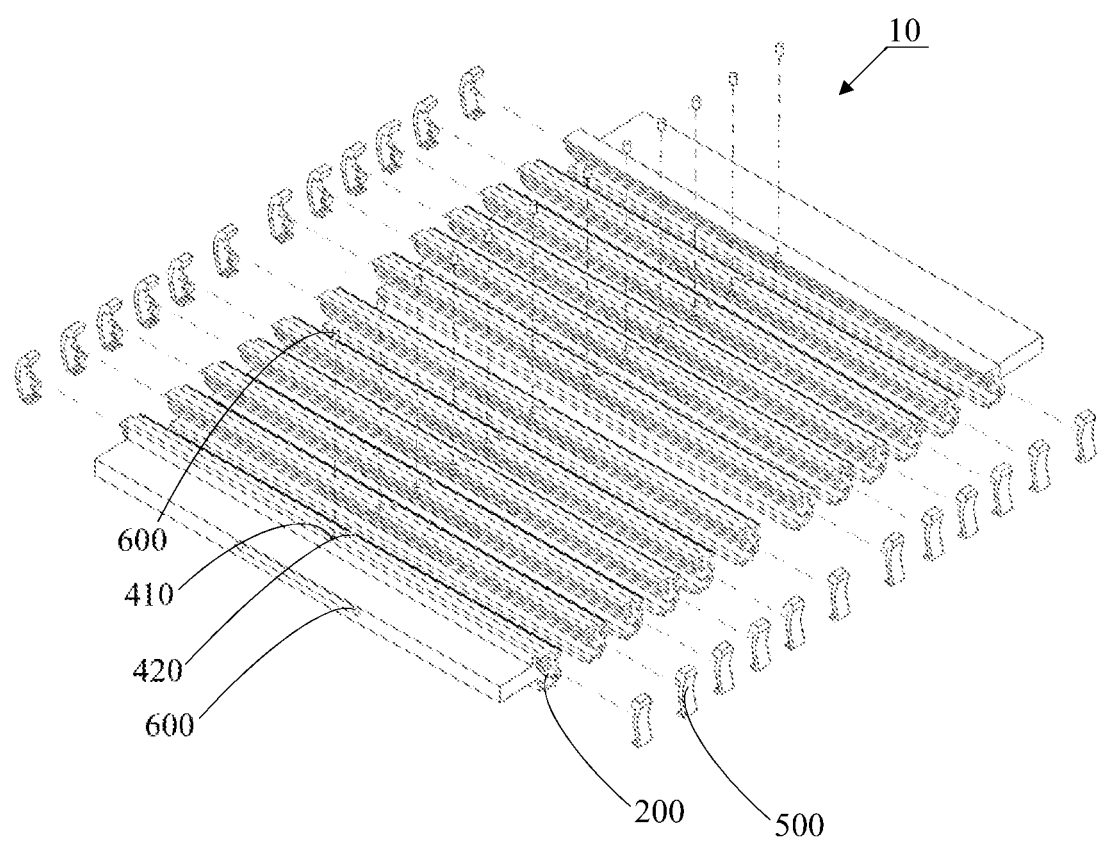
FIG. 12 is a schematic structural diagram of another hinge according to an embodiment of the present disclosure.

Based on the above embodiment, as shown in FIG. 10 to FIG. 12, a position-limit member 400 may be further provided between any adjacent joints. The position-limit member 400 can limit relative sliding between adjacent joints along an axial direction of the rotation shaft 210.

In the hinge 10 provided in this embodiment, the relative rotation of the adjacent joints 101 in a radial direction of the rotation shaft 210 realizes extension or bending of the hinge 10. At this point, at least two joints 101 in the hinge 10 are maintained in a relatively fixed state in the axial direction of the rotation shaft 210, thereby ensuring a stable connection between the adjacent joints 101. In order to prevent the relative sliding of the joints 101 in the axial direction to affect the connection stability between the joints 101, the presence of the position-limit member 400 between adjacent joints 101 can limit relative sliding between adjacent two joints 101 along the axial direction of the rotation shaft 210.

In a specific embodiment, as shown in FIG. 10 to FIG. 12, the position-limit member 400 is a pin. Among adjacent joints 101, the first joint 102 is provided with a shaft hole 410, and the second joint 103 is provided with an axial position-limit groove 420 at a position corresponding to the shaft hole 410.

The pin extends through the shaft hole 410 in the first joint 102 into the axial position-limit groove 420 of the second joint 103. The axial position-limit groove 420 can limit movement of the pin along the axial direction of the rotation shaft 210.

There is an overlapping area of any adjacent two joints 101. The shaft hole 410 is defined in the first joint 102 at a position corresponding to the overlapping area. The axial position-limit groove 420 is defined in the second joint 103 at a position corresponding to the overlapping area. The shaft hole 410 in the first joint 102 is in communication with the axial position-limit groove 420 in the second joint 103. Such communication may be achieved through direct contact between the first joint 102 and the second joint 103, or through a gap between the first joint 102 and the second joint 103.

The axial position-limit groove 420 provided in the second joint 103 has a narrow width in the axial direction of the rotation shaft 210, and the width may be equal to or slightly larger than a diameter of the pin. The axial position-limit groove 420 extends along the radial direction of the rotation shaft 210, which allows the pin to move along the axial position-limit groove 420 during the opening and closing movement of the first joint 102 and the second joint 103.

In the hinge 10 provided in this embodiment, when the two adjacent joints 101 are assembled, the pin extends through the shaft hole 410 of the first joint 102 and then extends into the axial position-limit groove 420 of the second joint 103. In this way, when the adjacent joints 101 are opened or closed, along with rotation of the first joint 102, the pin slides along the radial direction of the rotation shaft 210 in the axial position-limit groove 420 of the second joint 103, thereby effectively limiting the axial sliding between the adjacent joints 101 and then ensuring the connection stability of the hinge 10.

Based on the above embodiment, as shown in FIG. 10 to FIG. 13, each joint 101 is provided with a wiring through-hole 600. The wiring through-holes 600 of any adjacent joints 101 are in communication with each other.

When the hinge 10 provided in this embodiment is applied to a mobile terminal such as a flexible screen, the wiring of the mobile terminal may be exposed, which may affect the aesthetics, or, the wiring of the mobile terminal may easily wrap with the hinge 10, which will affect the normal bending of the hinge 10. Thus, the wiring through-hole 600 is defined in the joint 101, and the wiring through holes 600 of any adjacent joints 101 can be communicated. In this way, the relevant wiring of the mobile terminal can sequentially extend through the wiring through hole 600 in each joint 101 of the hinge 10, and such internal wiring avoids the influence of external wiring on external components and aesthetics.

Figure 13:
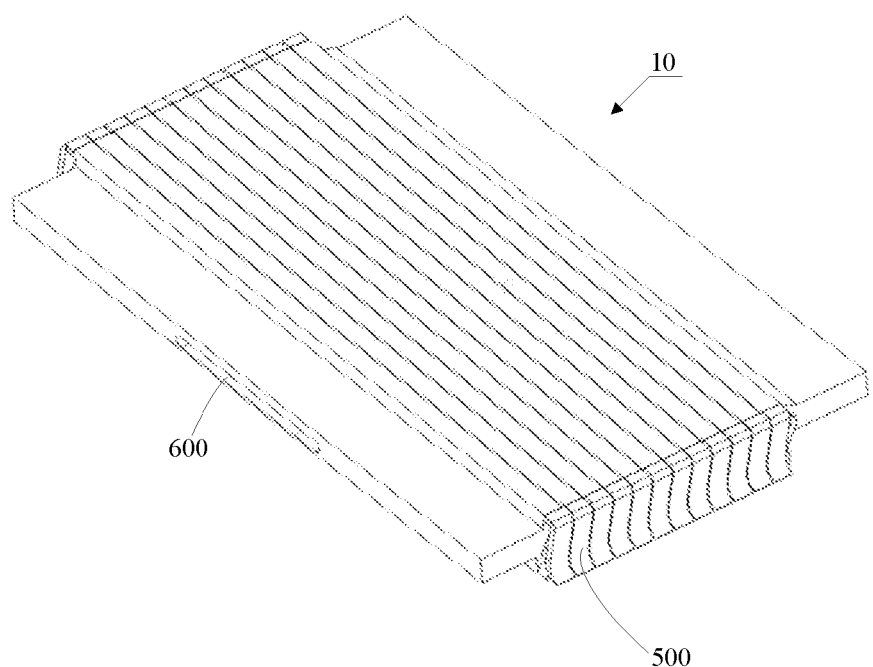
FIG. 13 is a schematic structural diagram of another hinge according to an embodiment of the present disclosure.

Based on the above embodiment, as shown in FIG. 12 and FIG. 13, an end cap 500 is covered on each of the first end portion and the second end portion of each joint 101.

In the hinge 10 provided in this embodiment, the end caps 500 are provided at the first end portion and the second end portion of the joint 101, and the end cap 500 is used to cover a connection portion of the adjacent joints 101, which can prevent the internal wiring from being exposed and affecting the appearance. Further, the end cap 500 can prevent water and dust, thereby further improving the closing performance and rotation sensitivity of the hinge 10. The end cap 500 may be made of a material such as a soft rubber. Other implementation schemes of the end cap 500 that can cover the end portions of the joint 101 may be applied to this embodiment without limitation.

Figure 14:
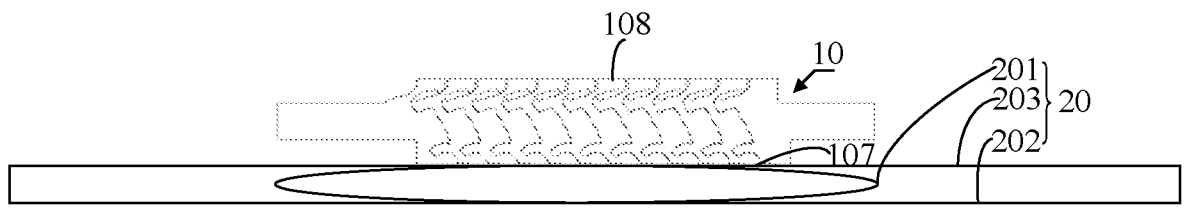
FIG. 14 and FIG. 15 are partial schematic structural diagrams of a mobile terminal according to an embodiment of the present disclosure.
Figure 15:
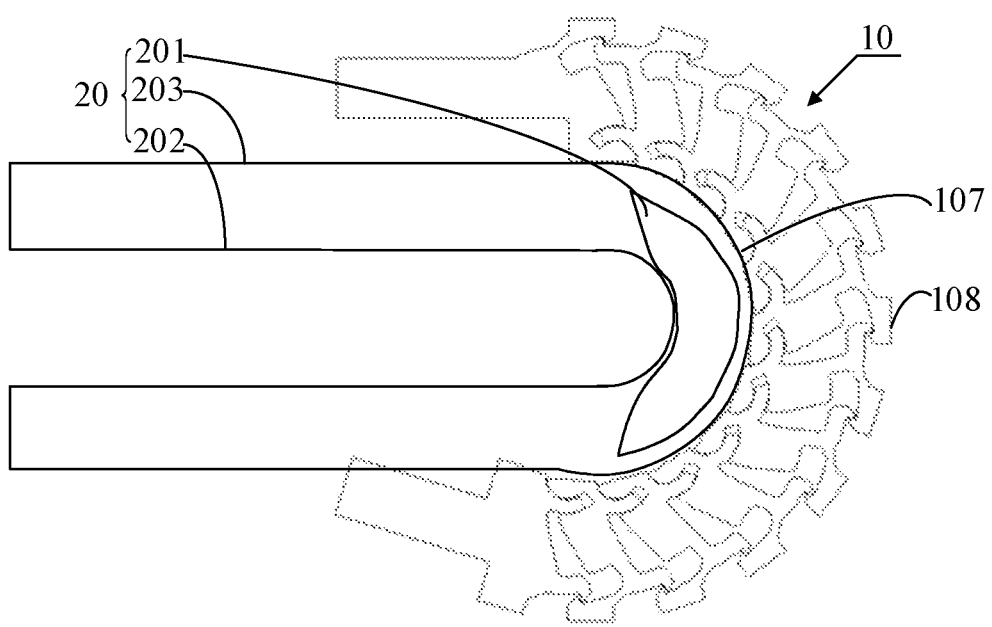

Referring to FIG. 14 and FIG. 15, one embodiment of the present disclosure further provides a mobile terminal, including a flexible screen 20 and the hinge 10 shown in any one of FIG. 1 to FIG. 13. The flexible screen 20 includes a bendable portion 201, and a display surface 202 and a non-display surface 203 opposite to each other.

The rotation structures of at least two joints of the hinge 10 are connected in sequence to form a fitting surface 107. The fitting surface 107 is attached to the non-display surface 203 at a position corresponding to the bendable portion 201 of the flexible screen 20.

The position-limit structures of at least two joints of the hinge 10 are connected in sequence to form a supporting surface 108. The supporting surface 108 is used to support the non-display surface 203 at the position corresponding to the bendable portion 201 of the flexible screen 20.

As shown in FIG. 14, when any two adjacent joints are closed, the lower surfaces of the rotation shafts of each of the joints are located on the same horizontal plane, and thus the formed fitting surface 107 is a horizontal plane. The fitting surface 107 is attached to the non-display surface 203 of the flexible screen 20, and supports extension of the flexible screen.

As shown in FIG. 15, when at least two joints 101 are opened, the lower surfaces of the rotation shafts of each of the joints define an arc fitting surface, and the outer surfaces of the position-limit chutes of the joints define an arc supporting upper surface. In this way, when the lower surfaces of at least two joints of the hinge are connected to form an arc fitting surface, the flexible screen can be smoothly curved in an arc shape as the hinge is opened, so that an outer surface of the flexible screen also forms a curved surface fitting with the arc fitting surface. When the lower surfaces of at least two joints of the hinge are connected to form a horizontal fitting surface, the flexible screen can be straightened horizontally as the hinge is closed, so that the outer surface of the flexible screen also forms a horizontal surface fitting with the horizontal fitting surface.

In this way, the supporting surface 108 of the joints is stretched or bent along with the fitting surface 107, which can effectively support the fitting surface 107 to fit and support the non-display surface 203 at a position corresponding to the bendable portion 201 of the flexible screen 20, without limiting a bending state of the surface of the bendable portion.

The mobile terminal may include, but is not limited to, a mobile phone, a tablet computer, a notebook computer, a palmtop computer, a car terminal, a wearable device, and a pedometer, or any device with a flexible component that is bendable, especially a flexible screen attached with a hinge, which is not limited.

In the mobile terminal provided in this embodiment, the hinge used to fit the flexible screen includes at least two joints of the same structure that are connected in sequence, and the rotation structures of any two adjacent joints are socketed with each other so that the rotation structures of the adjacent two joints are relatively rotated, and the opening degree of the adjacent two joints is limited within a preset range by the position-limit structure. In this way, the joints forming the hinge have the same structure, which is convenient for processing and assembling. A length of the hinge may be changed by increasing or decreasing the number of joints, which optimizes the assembly scheme of the hinge. The specific implementation process of the mobile terminal provided in the embodiment of the present disclosure may refer to the specific implementation process of the hinge provided in the above embodiment, which will not be repeated here.

The above are merely the optional embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the claims.

What is claimed is:

1. A hinge, comprising: at least two joints that are sequentially connected;
   wherein each joint comprises a joint body, a rotation structure provided at a first end portion of the joint body, and a position-limit structure provided at a second end portion of the joint body;
   the rotation structures of any adjacent two joints are socketed with each other;
   the rotation structures of adjacent two joints are capable of rotating relative to each other; the adjacent two joints are opened or closed via relative reciprocating motion between the position-limit structures of the adjacent two joints; and when an opening degree of the adjacent two joints reaches a preset value, the position-limit structures of the two adjacent joints stop each other;
   wherein a wiring through-hole is defined in each joint; and the wiring through-holes of any adjacent joints are aligned with each other along a length direction of the hinge and are in communication with each other, thereby defining a wiring channel that extends within the hinge along the length direction of the hinge.

2. The hinge according to claim 1, wherein the rotation structure comprises a rotation shaft and an arc rotation bearing shell, and an arc gap is defined between the rotation shaft and the joint body;
   in any two adjacent joints, the rotation bearing shell of a first joint is inserted into the gap of a second joint, to be socketed with the rotation shaft of the second joint; the rotation shaft of the second joint is rotatable relative to the rotation bearing shell of the first joint.

3. The hinge according to claim 2, wherein the position-limit structure comprises a position-limit chute and a position-limit hook, and an opening-closing gap is defined between the position-limit hook and the position-limit chute;
   in any two adjacent joints, the position-limit hook of the first joint extends into the position-limit chute of the second joint, and a chute edge of the position-limit chute of the second joint extends into the opening-closing gap; the position-limit hook of the first joint slides relatively within the position-limit chute of the second joint, thereby realizing opening or closing of the adjacent two joints; when the opening degree of the adjacent two joints reaches the preset value, the position-limit hook of the first joint and the chute edge of the position-limit chute of the second. joint stop each other.

4. The hinge according to claim 3, wherein when any adjacent two joints are closed, outer surfaces of the position-limit chutes of each of the joints form a horizontal supporting surface.

5. The hinge according to claim 4, wherein when at least two joints are opened, the outer surfaces of the position-limit chutes of each of the joints form an arc supporting surface.

6. The hinge according to claim 5, wherein the joint body of each joint comprises an accommodation groove and a projection disposed opposite to each other;
when any two adjacent joints are in a closed state, the projection of the first joint fits into the accommodation groove of the second joint.

7. The hinge according to claim 2, wherein a position-limit member is provided. between any adjacent joints; the position-limit member limits relative sliding between the adjacent joints along an axial direction of the rotation shaft.

8. The hinge according to claim 7, wherein the position-limit member is a pin; in any two adjacent joints, the first joint is provided with a shaft hole, and the second joint is provided with an axial position-limit groove at a position corresponding to the shaft hole;
wherein the pin extends through the shaft hole in the first joint into the axial position-limit groove of the second joint, and the axial position-limit groove limits movement of the pin along the axial direction of the rotation shaft.

9. A mobile terminal, comprising: a flexible screen and a hinge;
wherein the hinge comprises: at least two joints that are sequentially connected;
wherein each joint comprises a joint body, a rotation structure provided at a first end portion of the joint body, and a position-limit structure provided at a second end portion of the joint body;
the rotation structures of any adjacent two joints are socketed with each other;
the rotation structures of adjacent two joints are capable of rotating relative to each other; the adjacent two joints are opened or closed via relative reciprocating motion between the position-limit structures of the adjacent two joints; and when an opening degree of the adjacent two joints reaches a preset value, the position-limit structures of the two adjacent joints stop each other;
wherein a wiring through-hole is defined in each joint; and the wiring through-holes of any adjacent joints are aligned with each other along a length direction of the hinge and are in communication with each other, thereby defining a wiring channel that extends within the hinge along the length direction of the hinge;
wherein the rotation structures of at least two joints of the hinge are connected in sequence to form a fitting surface; the fitting surface is attached to a non-display surface at a position corresponding to a bendable portion of the flexible screen;
the position-limit structures of at least two joints of the hinge are connected in sequence to form a supporting surface; and the supporting surface supports the non-display surface of the flexible screen.

10. The mobile terminal according to claim 9, wherein the rotation structure comprises a rotation shaft and an arc rotation bearing shell, and an arc gap is defined between the rotation shaft and the joint body;
in any two adjacent joints, the rotation bearing shell of a first joint is inserted into the gap of a second joint, to be socketed with the rotation shaft of the second joint; the rotation shaft of the second joint is rotatable relative to the rotation bearing shell of the first joint.

11. The mobile terminal according to claim 10, wherein the position-limit structure comprises a position-limit chute and a position-limit hook, and an opening-closing gap is defined between the position-limit hook and the position-limit chute;
in any two adjacent joints, the position-limit hook of the first joint extends into the position-limit chute of the second joint, and a chute edge of the position-limit chute of the second joint extends into the opening-closing gap; the position-limit hook of the first joint slides relatively within the position-limit chute of the second joint, thereby realizing opening or closing of the adjacent two joints; when the opening degree of the adjacent two joints reaches the preset value, the position-limit hook of the first joint and the chute edge of the position-limit chute of the second joint stop each other.

12. The mobile terminal according to claim 11, wherein when any adjacent two joints are closed, outer surfaces of the position-limit chutes of each of the joints form a horizontal supporting surface.

13. The mobile terminal according to claim 12, wherein when at least two joints are opened, the outer surfaces of the position-limit chutes of each of the joints form an arc supporting surface.

14. The mobile terminal according to claim 13, wherein the joint body of each joint comprises an accommodation groove and a projection disposed opposite to each other;
when any two adjacent joints are in a closed state, the projection of the first joint fits into the accommodation groove of the second joint.

15. The mobile terminal according to claim 10, wherein a position-limit member is provided between any adjacent joints; the position-limit member limits relative sliding between the adjacent joints along an axial direction of the rotation shaft.

16. The mobile terminal according to claim 15, wherein the position-limit member is a pin; in any two adjacent joints, the first joint is provided with a shaft hole, and the second joint is provided with an axial position-limit groove at a position corresponding to the shaft hole;
wherein the pin extends through the shaft hole in the first joint into the axial position-limit groove of the second joint, and the axial position-limit groove limits movement of the pin along the axial direction of the rotation shaft.

17. The hinge according to claim 2, wherein when any adjacent two joints are in a closed state, lower surfaces of the rotation shafts of the any adjacent two joints are connected to define a horizontal fitting surface; when any adjacent two joints are opened, the lower surfaces of the rotation shafts of the any adjacent two joints are connected to define an arc supporting surface.

18. The hinge according to claim 1, wherein the wiring through-hole extends through the joint body of each joint, and is between the rotation structure and the position-limit structure of each joint.

19. The mobile terminal according to claim 9, wherein the fitting surface is directly attached to the non-display surface at the position corresponding to the bendable portion of the flexible screen.

20. The mobile terminal according to claim 9, wherein the at least two joints of the hinge are in direct contact with the non-display surface at the position corresponding to the bendable portion of the flexible screen.

\* \* \* \* \*